(12) United States Patent
Cranfill

(10) Patent No.: US 10,580,223 B2
(45) Date of Patent: Mar. 3, 2020

(54) SYSTEM AND PROCESS FOR TIMING COMPETITIVE ATHLETIC EVENTS

(71) Applicant: Scott Cranfill, Indianapolis, IN (US)

(72) Inventor: Scott Cranfill, Indianapolis, IN (US)

(73) Assignee: Scott Cranfill, Indianapolis, IN (US)

( * ) Notice: Subject to any disclaimer, the term of this patent is extended or adjusted under 35 U.S.C. 154(b) by 0 days.

(21) Appl. No.: 15/650,999

(22) Filed: Jul. 17, 2017

(65) Prior Publication Data

US 2020/0027282 A1   Jan. 23, 2020

(51) Int. Cl.
*G07C 1/24* (2006.01)
*A63B 24/00* (2006.01)
*H04W 4/02* (2018.01)
*H04W 4/80* (2018.01)

(52) U.S. Cl.
CPC ............ *G07C 1/24* (2013.01); *A63B 24/0062* (2013.01); *H04W 4/02* (2013.01); *H04W 4/80* (2018.02); *A63B 2024/0025* (2013.01)

(58) Field of Classification Search
CPC ............ A63B 24/0062; A63B 2225/20; A63B 2225/54; A63B 2024/0025; G07C 1/24; H04W 4/80; H04W 4/02

USPC .............. 340/323 R, 309.16, 539.11, 539.13, 340/573.1; 700/91
See application file for complete search history.

(56) References Cited

U.S. PATENT DOCUMENTS

| | | |
|---|---|---|
| 5,436,611 A | 7/1995 | Arlinghaus, Jr. |
| 8,085,136 B2 | 12/2011 | Stewart et al. |
| 8,935,124 B2 | 1/2015 | Howell |
| 9,330,203 B2 | 5/2016 | Rosen et al. |
| 9,489,552 B2 | 11/2016 | Hansen |
| 2010/0097208 A1 | 4/2010 | Rosing et al. |
| 2016/0023043 A1* | 1/2016 | Grundy .............. A63B 24/0062 482/8 |
| 2016/0139241 A1* | 5/2016 | Holz ...................... H04B 17/27 367/128 |

* cited by examiner

*Primary Examiner* — John A Tweel, Jr.

(57) ABSTRACT

A competitive event timing system is provided that collects and processes event data for one or more event participants progressing along a race course. The competitive event timing system of this embodiment includes an event management device, a plurality of Bluetooth Low Energy (BLE) devices, and a plurality of mobile detection devices located at a point along a race course.

18 Claims, 3 Drawing Sheets

SYSTEM AND PROCESS FOR TIMING COMPETITIVE ATHLETIC EVENTS

TECHNICAL FIELD

The present invention generally relates to competitive athletic event timing systems and methods, and more particularly, but not exclusively, to timing competitive athletic events where participants are measured by the amount of time it takes for the participant to travel a specific distance.

Conventional event timing systems, such as RFID based timing technologies, involve a computer running specialized software, a RFID reader device, a plurality of RFID antennas, a 120-volt power source, and passive RFID tags. Quite often, RFID systems are cumbersome to implement due to the number of RFID antennas needed to achieve accurate results, the necessity to mount the RFID antennas onto a structure, and having to meet the power requirements for all the equipment. Disadvantages multiply with multiple locations along an event course limiting the number of RFID sensing points. This type of system is expensive and requires trained professionals to set up and operate.

As such, race events with fewer than 500 participants typically can't afford to hire an event timing company and resort to timing the event manually.

Present approaches to event timing systems suffer from a variety of drawbacks, limitations, disadvantages and problems including those respecting equipment, expertise, and others. There is a need for the unique and inventive competitive athletic event timing apparatuses, systems and methods disclosed herein.

SUMMARY OF THE INVENTION

One embodiment of the present invention entails an event timing system having detection devices hosting software applications and Bluetooth Low Energy devices.

The advantages of the present invention include, without limitation, a simplistic implementation of the solution for a competitive athletic event which is less expensive than other timing systems, enables non-technical experts to electronically time a competitive athletic event, and maintains an acceptable level of timing accuracy.

Other embodiments include apparatuses, systems, devices, hardware, methods, and combinations for competitive athletic event timing. Further embodiments, forms, features, aspects, benefits, and advantages of the present application shall become apparent from the description and figures provided herewith.

DETAILED DESCRIPTION OF THE INVENTION

Figure 1:
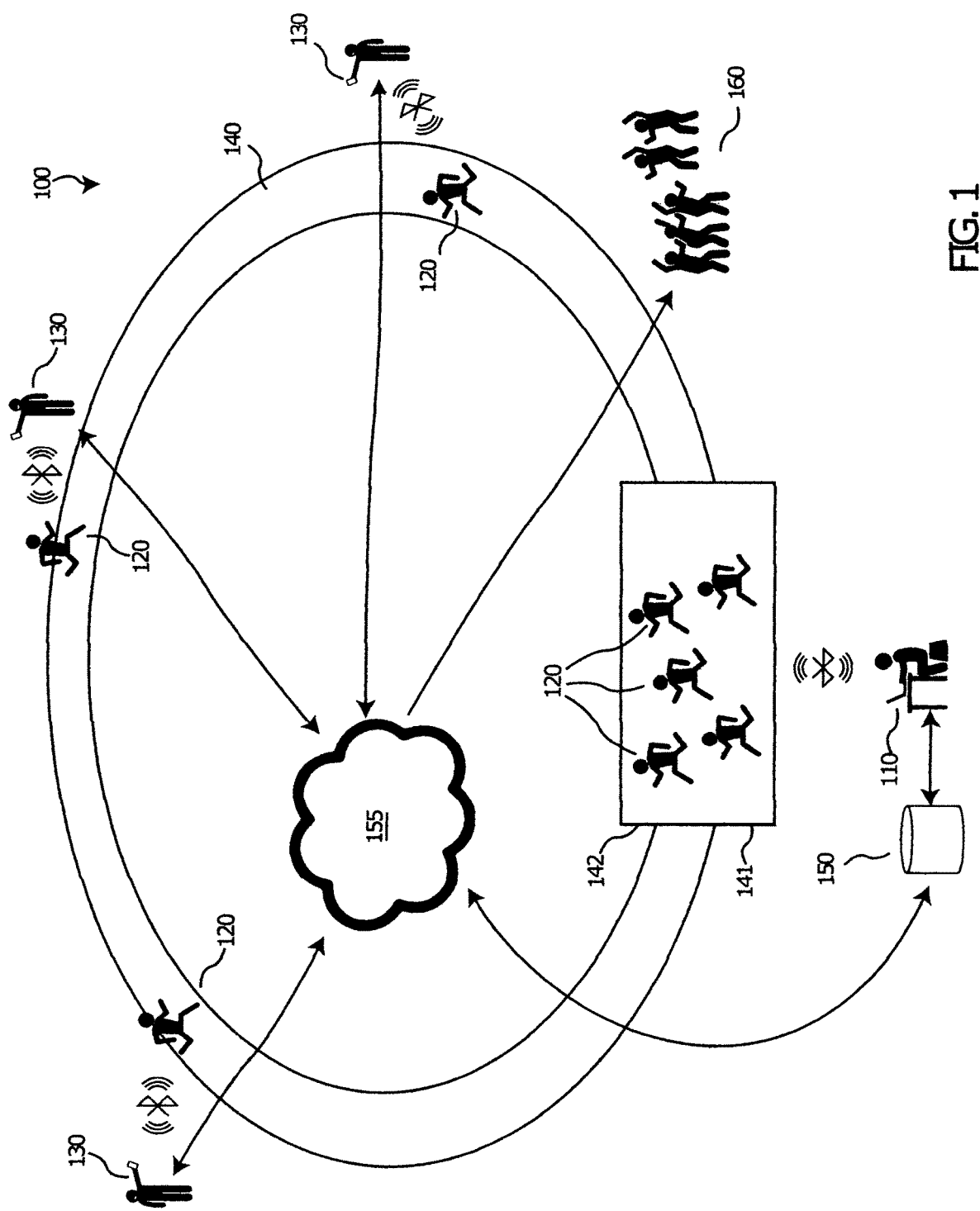
FIG. 1 is diagram of an event timing system of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Embodiments of the present invention provide systems, methods, and computer program products for timing competitive athletic events, events such as running and walking races (marathons, half-marathon, 10 k, 5 k, 1 mile, and cross-country events), cycling races, kayak races, canoe races, and any other events where event coordinators measure the amount of time it takes for a participant to participate, usually by traveling along a specific distance.

In accordance with one aspect of the present inventive subject matter, a competitive event timing system is provided that collects and processes event data for one or more event participants progressing along a course. The competitive event timing system of this embodiment includes an event management device, a plurality of Bluetooth Low Energy (BLE) devices, and a plurality of mobile detection devices located at points along a course.

The event management device is capable of managing event data, detecting participant BLE devices and communicating with event databases. Each participant BLE device can be provisioned with an identifier which is distinguishable from the identifiers of the other BLE devices. A BLE device is designed to be borne by a corresponding event participant to thereby identify the corresponding event participant with the identifier that the BLE device is provisioned with. The mobile detection devices can be configured with software and are capable of detecting the participant BLE devices over radio waves to wirelessly detect each BLE device's unique identifier as the BLE device passes by the mobile detection device.

In the embodiment shown in FIG. 1, an event timing system 100 includes an event management device 110, a plurality of participants 120 carrying a corresponding BLE device, and a plurality of mobile detection devices 130 located along an event route 140. The event management device 110 manages event information provided before the event start, collected during the event, and determined during and after the event completion. The event management device 110 detects participants 120 by their corresponding BLE device, each having an identifier unique to that BLE device and therefore participant.

At the start of an event, the event management device 110 records the detected participants 120 by their BLE devices as they pass a starting position 141. Event data is collected including participant identifier, starting position, and time stamp and is recorded in an event database 150. During the event, the mobile detection devices 130 are capable of detecting participants 120 by their corresponding BLE device and reporting an event record including the identifier for the detected participant 120, the location of the mobile detection device 130, and a time stamp. The event record is reported to an event mobile database 155. The event mobile database 155 can share the event record with specified spectators 160 and send the event record to the event management device 110. At completion of the event, the participants 120 pass a finishing position 142 where event data is again collected including participant identifier, finishing position, and time stamp. The event management device 110 is capable of managing the event records and determining and reporting event information such as participant time placement amongst a specified group and progress information.

In a specific embodiment, an event administrator timing an event signals the start of the event via the software application residing on an event management device. The software on the event management device stores the event start date and time in an event management database. The event management device can include a personal computer, a tablet computer, or a mobile phone, to name a few. The event management device can also include a plurality of input devices communicating with a central computing device running event management software. The event management device establishes wireless connections to BLE devices within its range, typically 30-50 meters; however, theoretical limits extend beyond this range. The event management device wirelessly detects each BLE device's unique ID and Radio Signal Strength as the BLE device passes by the event management device.

The event management device detects a participant BLE device with its unique identifier as a participant passes an event starting point. The management device records the identifier for the participant BLE device along with a participant event start time stamp in an event management database. When event participants cross the finish line, the event management device detects the unique identifier of the participant BLE devices. The participant's unique identifier and event completion time stamp are stored in the event management database. The software application on the event management device calculates a participant's finish time based on the data collected for the participant and stored in the event management database.

The event management device will have event management software capable of setting up event and event participant information, detecting participant event data during an event, and managing the participant data throughout the event.

Event information can include, but is not limited to, date, event distances, event start time, course routes, and maximum number of participants. Event participant information can include, but is not limited to, name, gender, age, emergency contact information, event attending, and special accommodations. Race participant data can include, but is not limited to, start time, finish time, pace, elapsed time at points along the course. Managing participant data can include, but is not limited to, calculating finish position based on overall time, gender-sorted overall time, age-sorted overall time, calculating average pace, and posting and communicating race results.

The system of this embodiment also includes a plurality of Bluetooth Low Energy (BLE) devices. Each event participant will have a unique identifier based on a BLE device. The BLE device can include, but not limited to, a BLE wristband, a smart watch, a smart phone, a fitness tracker, a location tracker, and the like. The BLE device can be worn or carried by various means at any point along a participant's body. The BLE device can be provided by the event administrators or by the event participant. The event management software will store the unique identifier for an event participant's BLE device in the event participant information. Event participant data collected will be associated with the event participant's unique identifier and recorded by the event management software for that participant. The event management software uses the BLE device information captured for each participant at the beginning of the event and again as the participant crosses the finish line to calculate the duration of time it takes a participant to complete a competitive event.

The system of this embodiment further includes a plurality of mobile detection devices. A mobile detection device can include, but not limited to, a laptop computer, tablet computer, or mobile phone. The mobile detection devices are capable of running a software application which facilitates the competitive athletic event by providing intermediate event data. Each of the mobile detection devices is capable of detecting the BLE devices and communicating with a cloud software application for storing data associated with the BLE devices. An event management device is also capable of accessing the event participant data stored with the cloud software application for reporting and publishing event results and statistics.

As a feature of an embodiment, a mobile detection device establishes wireless connections to BLE devices within its range, typically 30-50 meters; however theoretical limits extend beyond this range. The mobile detection device wirelessly detects each BLE device's unique ID and Radio Signal Strength as the BLE device passes by the mobile detection device. Each mobile detection device can be positioned at a point along the race course. The BLE device's unique ID and Radio Signal Strength are transmitted by the mobile detection device to a mobile event data database along with a location and time stamp. The mobile event database can share event data or the event management device can access the mobile event database to retrieve event data for analysis with the event management software.

In another embodiment, the BLE devices operate in an 'advertising mode' in which the BLE devices advertise data so that they can be discovered and transfer data without an explicit pairing operation with another device. When a BLE device is advertising, it is broadcasting public advertising data that any other BLE-capable device is able to receive and react to. BLE devices broadcast their advertising packets at intervals. The interval value of the BLE device is configurable to suit the characteristics of the device. At each BLE device's programmed broadcast interval, the BLE device broadcasts its advertisement packet with the BLE device's unique ID and a Radio Signal Strength. The advertised packet contains a unique ID which allows the BLE device to be identified. The advertised packet also communicates information about the strength of the signal being received which can be used to detect the proximity of the BLE device to a mobile detection device thereby determining if the BLE device is traveling towards the mobile detection device or away from it. The signal strength analysis can provide precise information on a participant's location and elapsed race time throughout the race course.

Figure 2:
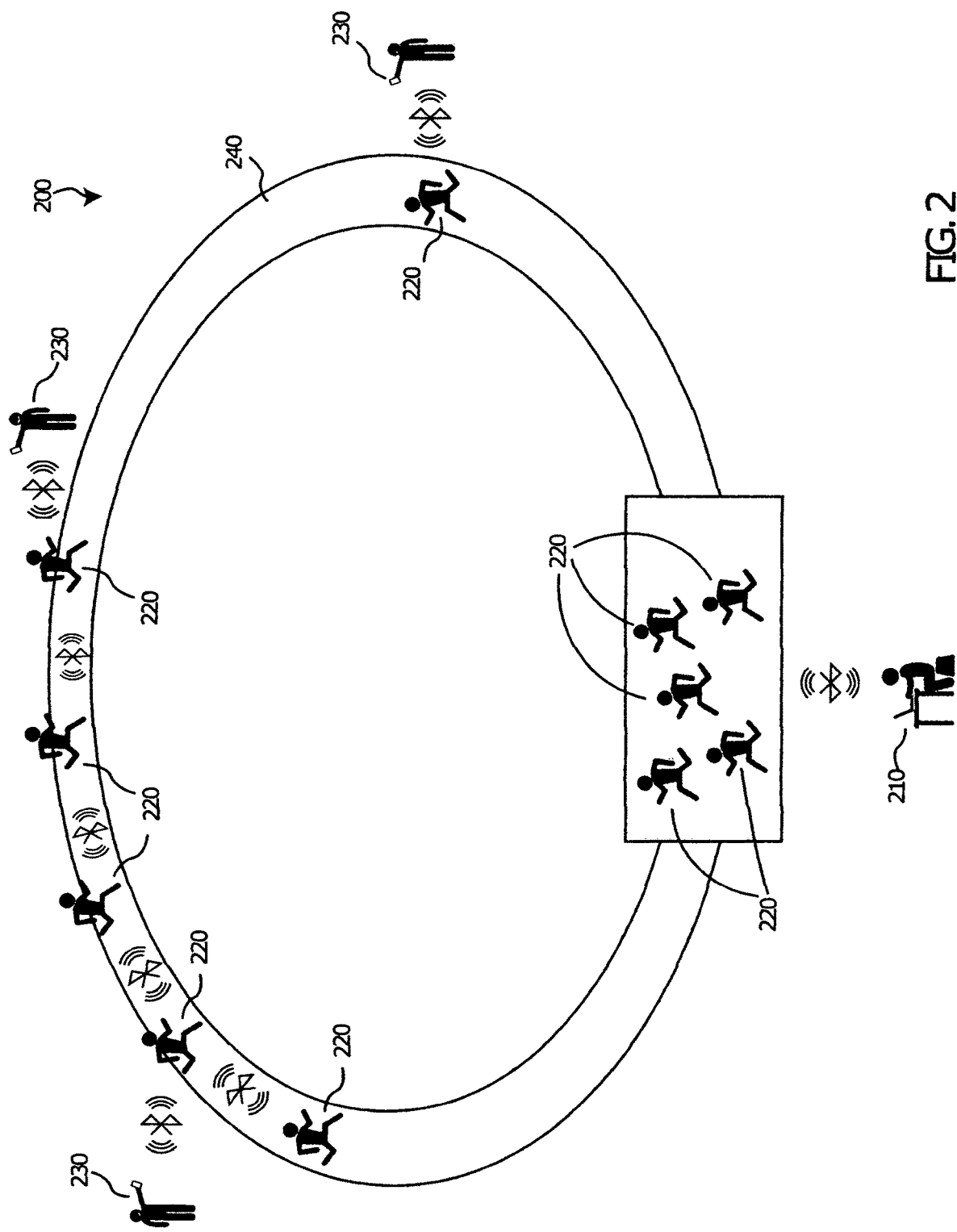
FIG. 2 is diagram of another event timing system of the present application.

In yet another embodiment as shown in FIG. 2, a race event 200 includes an event management device 210 and participant-worn BLE devices 220 which may cooperate with other BLE devices 220 to relay participant-related information, such as the BLE device's unique broadcast ID, position, speed, course, and fitness information. The sharing by the BLE devices 220 can create a mesh network of participant information that may then be conveyed to mobile detection devices 230 along a race course 240.

Mobile detection devices 230 may provide information to a participant over the BLE connection to the participant's BLE device 220, such as position, elapsed time, pace, location of other participants, as the participant passes by a mobile detection device or a volunteer's mobile device 230 running the appropriate software. Any computing device capable of detecting and reading BLE-shared information could be a race data device and become part of the mesh network.

Further features of an event timing system can include a race management device capable of facilitating multiple events concurrently. For example, a competitive race event may offer distances of marathon, half marathon, 10K, and 5K. The race management software associates participants for with the event for which the participant is registered. The race administrator or the race management software can start all events at the same time, "gun start", or start each event individually. Upon the participant finishing the event, the race management software reports the participant's finish time for that finisher's event.

It should be understood, that the competitive athletic event may include a greater or lesser number of participants to track and record race start and finish times. For example, a small charitable event could have only 50-100 participants where large events could have several thousand participants. A plurality of mobile detection devices will be leveraged for larger events and for providing a back up to the race management device.

Figure 3:
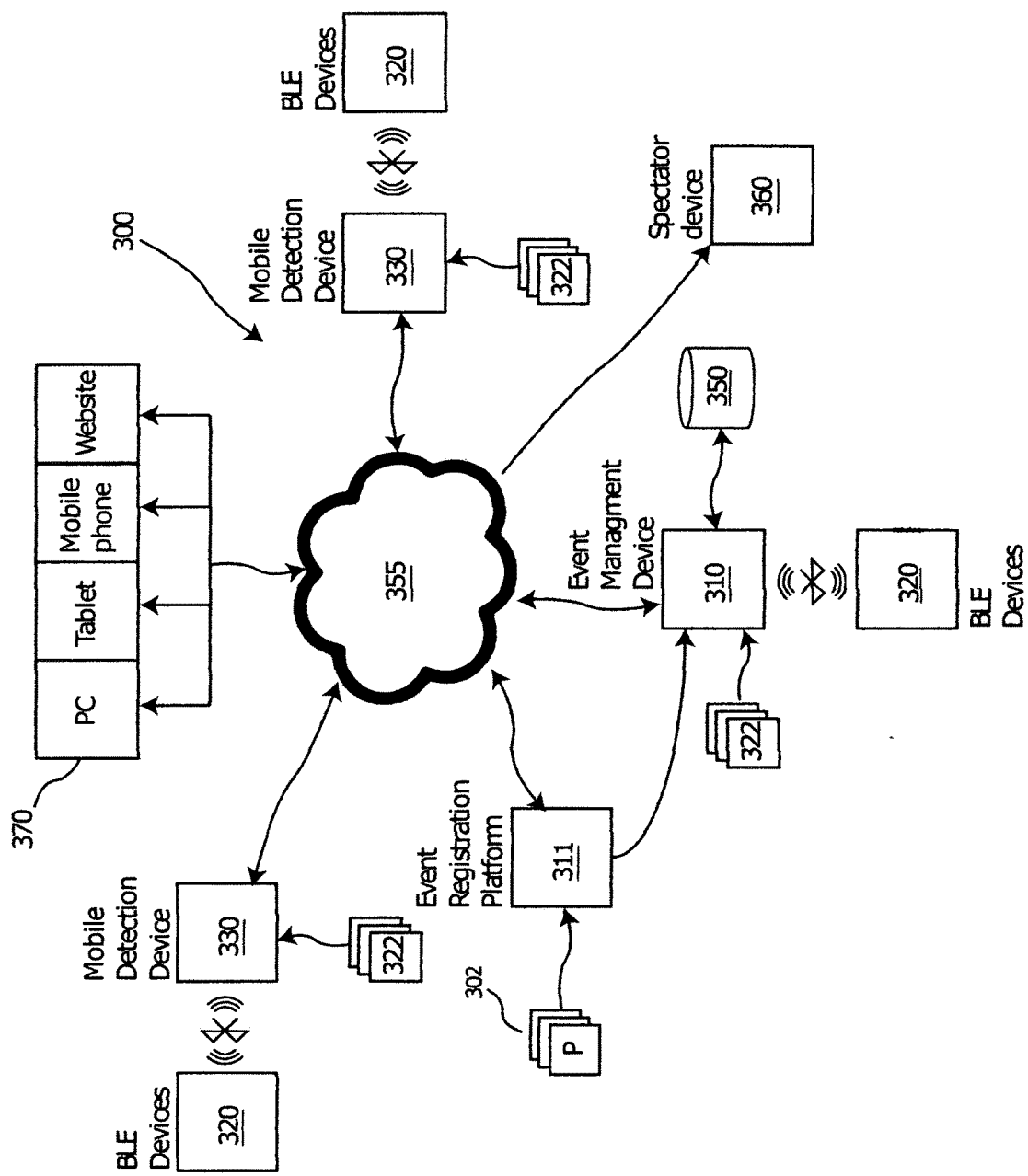
FIG. 3 is a schematic diagram for an event timing system of the present application.

A schematic diagram shown in FIG. 3 demonstrates an embodiment of the present application where an event management and communication architecture 300 includes an event management device 310 with a management database 350. Bluetooth Low Energy devices 320, mobile detection devices 330 and a mobile database 355. An event registration platform 311 transmits participant files 302 to the event management device 310 where the event management device 310 can store the participant files 302 in the management database 350. The event management device 310 and mobile detection devices 330 are capable of detecting BLE devices 320. When a BLE device 320 is detected, the event management device 310 or mobile detection device 330 creates an event record 322 from information related to the BLE device 320 and other indicators. The event records 322 can be transmitted to the management database 350 and/or the mobile database 355. The databases 350, 355 are capable of storing, processing, and transmitting event records 322 based on the detection of the BLE device 320.

In this embodiment, the mobile database 355 and the event management device 310 are capable of accepting requests from emote systems 370 regarding participant data. A remote system 370 can be a personal computer, a tablet computer, a mobile phone, or a website, for example. In response to the request, participant data obtained from the event record 322 can be sent to the remote system 370 or a designated spectator device 360. Requests can be for data from a single participant's event record 322. Another example would be a request for standing instructions to send data for all participant event records 322 related to a particular participant.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An event timing system comprising:
    an event management device capable of running an event management application;
    a plurality of Bluetooth Low Energy devices, each having a corresponding participant identifier; and
    a plurality of mobile detection devices capable of running a mobile detection application, wherein the event management device is configured to wirelessly detect the plurality of Bluetooth Low Energy devices individually with the event management application configured to create:
        an event record of the corresponding participant identifier, as one of the plurality of Bluetooth Low Energy devices moves into a detection range of the event management device, and a time and location stamp, and
        an event statistic based on the corresponding participant identifier and the time and location stamp, and
    wherein the plurality of mobile detection devices are configured to wirelessly detect the plurality of Bluetooth Low Energy devices, with the mobile detection application configured to:
        create a mobile record of the corresponding participant identifier, as one of the plurality of Bluetooth Low Energy devices moves into a detection range of the corresponding mobile detection device, and a time and location stamp, and
        transmit the mobile record to a mobile record database.

2. The event timing system of claim 1, wherein the event management application further includes an event information database including event data selected from a group consisting of participant information, event information, event records, event statistics, and combinations thereof.

3. The event timing system of claim 1, wherein the event management application further includes an event information database having a participant information record including the corresponding participant identifier for each of the plurality of Bluetooth Low Energy devices.

4. The event timing system of claim 3, wherein the event management application and the mobile detection application are configured to detect the plurality of Bluetooth Low Energy devices with the corresponding participant identifiers included in the event information database.

5. The event timing system of claim 1, wherein the plurality of mobile detection devices are located at points along an event course.

6. The event timing system of claim 1, wherein the mobile record database is capable of sending a participant update including the mobile record.

7. The event timing system of claim 1, wherein the mobile record database is capable of analyzing the mobile record to produce a mobile participant statistic.

8. The event timing system of claim 7, wherein the mobile record database is capable of sending a participant update including the mobile participant statistic.

9. The event timing system of claim 1, wherein the race event management device configured to wirelessly detect the Bluetooth Low Energy devices further includes a determination of whether the Bluetooth Low Energy devices are traveling towards the event management device or are traveling away from the event management device based on a changing BLE signal strength of the Bluetooth Low Energy device detected by the event management device, and wherein one of the plurality of mobile detection devices configured to wirelessly detect the Bluetooth Low Energy device further includes a determination if the Bluetooth Low Energy device is traveling towards the mobile detection device and if the Bluetooth Low Energy device is traveling away from the mobile detection device, based on a changing BLE signal strength of the Bluetooth Low Energy device detected by the mobile detection device.

10. An event timing method comprising:
providing an event management device running an event management application, a plurality of Bluetooth Low Energy devices, each Bluetooth Low Energy device having a corresponding participant identifier and being carried by a corresponding participant, and a plurality of mobile detection devices running a mobile detection application;
providing a set of event data for a plurality of racing events to an event information database;
detecting one of the plurality of Bluetooth Low Energy devices with the event management device;
creating an event record of the corresponding participant identifier, as the detected Bluetooth Low Energy device moves into a detection range of the event management device, including a time and location stamp and an event identifier associated with at least one of the plurality of racing events;
creating an event statistic based on the corresponding participant identifier, the time and location stamp, and the event identifier;
detecting one of the plurality of Bluetooth Low Energy devices with one of the plurality of mobile detection devices;
creating a mobile record of the corresponding participant identifier, as the detected Bluetooth Low Energy device moves into a detection range of the mobile detection device, including a time and location stamp and the event identifier; and
transmitting the mobile record to a mobile record database.

11. The event timing method of claim 10, further including:
receiving a set of instructions from a remote system including a selected participant and a selected recipient;
sending the event record for the selected participant to the selected recipient in response to the received set of instructions; and
sending the mobile record for the selected participant to the selected recipient in response to the received set of instructions.

12. The event timing method of claim 10, further including:
creating a participant update from the event record and the mobile record;
receiving a set of instructions from a remote system including a selected participant and a selected recipient; and
sending the participant update for the selected participant to the selected recipient in response to the received set of instructions.

13. The event timing method of claim 10, further including:
receiving a set of participant information from an event registration platform;
creating a participant file from the set of participant information; and
correlating the participant file with the detected Bluetooth Low Energy device and the corresponding participant identifier.

14. The event timing method of claim 10, further including:
detecting a change in the Bluetooth Low Energy signal strength of the Bluetooth Low Energy device detected by the event management device;
determining if the Bluetooth Low Energy device is traveling towards the event management device based on the change in the BLE signal strength of the Bluetooth Low Energy device;
determining if the Bluetooth Low Energy device is traveling away from the event management device based on the change in the BLE signal strength of the Bluetooth Low Energy device;
detecting a change in the Bluetooth Low Energy signal strength of the Bluetooth Low Energy device detected by the mobile detection device;
determining if the Bluetooth Low Energy device is traveling towards the mobile detection device based on the change in the BLE signal strength of the Bluetooth Low Energy device detected by the mobile detection device; and
determining if the Bluetooth Low Energy device is traveling away from the mobile detection device based on the change in the BLE signal strength of the Bluetooth Low Energy device detected by the mobile detection device.

15. The event timing method of claim 10, wherein the detecting one of the plurality of Bluetooth Low Energy devices further includes:
comparing the corresponding participant identifier of one of the plurality of Bluetooth Low Energy devices with the set of event data for the plurality of events.

16. The event timing method of claim 10, further including locating at least a portion of the plurality of mobile detection devices along a course.

17. An event timing system comprising:
an event management device capable of running an event management application;
a plurality of Bluetooth Low Energy devices, each having a corresponding participant identifier and capable of being carried by a corresponding participant and being operated in an advertising mode to broadcast public advertising data; and
a plurality of mobile detection devices capable of running a mobile detection application, wherein the event management device is configured to wirelessly detect the broadcasted public advertising data with the event management application, the event management application configured to create:
an event record of the corresponding participant identifier, as the detected Bluetooth Low Energy device moves into a detection range of the event management device, including a time and location stamp, and
an event statistic based on the corresponding participant identifier and the time and location stamp, and
wherein the plurality of mobile detection devices is are configured to wirelessly detect the broadcasted public advertising data with the mobile detection application, the mobile detection application capable of:
creating a mobile record of the corresponding participant identifier, as the detected Bluetooth Low Energy device moves into a detection range of the mobile detection device, including a time and location stamp, and
transmitting the mobile record to a mobile record database.

18. The event timing system of claim 17, wherein the plurality of Bluetooth Low Energy devices are capable of communication with all other of the plurality of Bluetooth Low Energy devices configured to create a participant communication mesh network capable of relaying the participant data packet among a group of race participants and at least one of the plurality of mobile detection devices.

* * * * *